(12) United States Patent
Guldan et al.

(10) Patent No.: US 9,545,925 B1
(45) Date of Patent: Jan. 17, 2017

(54) TRANSMISSION SYSTEM IMPLEMENTING AUTOMATED DIRECTIONAL SHIFT BRAKING

(71) Applicant: Caterpillar Inc., Peoria, IL (US)

(72) Inventors: Mathew D. Guldan, East Peoria, IL (US); Matthew Michael Tinker, Peoria, IL (US); Chintan Govindbhai Kothari, Dunlap, IL (US); Bradley John Will, Peoria, IL (US); Timothy Alan Lorentz, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/871,460

(22) Filed: Sep. 30, 2015

(51) Int. Cl.
| B60W 10/02 | (2006.01) |
| B60W 10/184 | (2012.01) |
| B60W 30/18 | (2012.01) |

(52) U.S. Cl.
CPC ........ *B60W 30/18036* (2013.01); *B60W 10/02* (2013.01); *B60W 10/184* (2013.01); *B60W 2510/104* (2013.01); *B60W 2510/1045* (2013.01); *B60W 2540/16* (2013.01); *B60W 2710/021* (2013.01)

(58) Field of Classification Search
None
See application file for complete search history.

(56) References Cited

U.S. PATENT DOCUMENTS

| 3,910,389 | A | 10/1975 | Pleier |
| 4,248,330 | A | 2/1981 | Audiffred, Jr. et al. |
| 4,300,652 | A | 11/1981 | Redzinski et al. |
| 5,053,963 | A | 10/1991 | Mack |
| 5,522,779 | A * | 6/1996 | Tabata ................ F16H 61/0246 477/126 |
| 5,588,515 | A | 12/1996 | Toyama et al. |
| 6,019,202 | A | 2/2000 | Anwar |
| 6,640,179 | B2 | 10/2003 | Katakura et al. |
| 6,644,454 | B2 | 11/2003 | Yamada et al. |

(Continued)

FOREIGN PATENT DOCUMENTS

EP    0436978    6/1994

OTHER PUBLICATIONS

U.S. Application entitled "Transmission System Implementing Automated Directional Shift Braking" by Matthew Michael Tinker et al. filed on Sep. 30, 2015.

*Primary Examiner* — Edwin A Young
(74) *Attorney, Agent, or Firm* — Finnegan, Henderson, Farabow, Garrett & Dunner, LLP (57) ABSTRACT

A transmission system is disclosed for use with a machine. The transmission system may have a first clutch configured to transfer power in a first direction, a second clutch configured to transfer power in a second direction, a brake, and an interface device configured to generate a first signal indicative of a desire to shift power transfer directions. The transmission system may also have a controller configured to cause disengagement of the first clutch in response to the first signal, to cause the brake to apply a retarding torque to a traction device, and to determine an amount of the retarding torque being applied to the traction device. The controller may also be configured to selectively transfer the retarding torque to the second clutch when a capacity of the second clutch to provide retarding torque is about equal to the amount of the retarding torque being applied by the brake.

20 Claims, 4 Drawing Sheets

(56) References Cited

U.S. PATENT DOCUMENTS

| | | |
|---|---|---|
| 6,811,015 B2 | 11/2004 | Tietze |
| 6,910,988 B2 | 6/2005 | Carlsson |
| 7,676,313 B2 | 3/2010 | Ortmann et al. |
| 7,946,404 B2 | 5/2011 | Nakagawa et al. |
| 8,880,303 B2 | 11/2014 | Ishikawa et al. |
| 8,897,976 B2 | 11/2014 | Lister et al. |
| 9,086,127 B2 | 7/2015 | Petrigliano et al. |
| 2008/0081735 A1 | 4/2008 | Runde |
| 2010/0312440 A1 | 12/2010 | Ellis et al. |
| 2011/0308649 A1* | 12/2011 | Shimizu .............. F16H 61/0206 137/565.11 |
| 2013/0192918 A1* | 8/2013 | Newlon .................. F16H 61/47 180/307 |
| 2015/0158492 A1 | 6/2015 | Bulgrien et al. |

* cited by examiner

TRANSMISSION SYSTEM IMPLEMENTING AUTOMATED DIRECTIONAL SHIFT BRAKING

TECHNICAL FIELD

The present disclosure relates generally to a transmission system and, more particularly, to a transmission system implementing automated directional shift braking.

BACKGROUND

A mobile machine, such as a wheel loader, a track-type-tractor, a motor grader, or a haul truck, includes a transmission that transfers rotational power from an engine of the machine to wheels or other traction devices. A typical transmission includes two directional clutches (e.g., a forward clutch and a reverse clutch) that are selectively engaged to alter a power flow path between the engine and the wheels. During forward travel, only the forward clutch should be engaged to transfer mechanical rotation from the engine through the wheels in a forward direction. During reverse travel, only the reverse clutch should be engaged to transfer the same mechanical rotation through the wheels in a reverse direction. During a directional shift change (i.e., when shifting between the forward and reverse directions), a first of the two directional clutches will release at about the same time as or before the second of the directional clutches engages.

If the directional shift change is attempted while the machine is moving, significant momentum aligned with the first travel direction must first be dissipated before the machine can begin accelerating in the second and opposite travel direction. This momentum is generally dissipated via friction material inside the engaging clutch. That is, the second clutch will generally slip until sufficient power has been dissipated to avoid shock-loading and damage to the remaining drivetrain components of the machine. During slipping, some of the friction material of the second clutch is worn away. In some situations, an operator of the machine may attempt to manually brake the machine during shifting between travel directions to reduce the amount of momentum that must be absorbed by the friction material of the second clutch. By doing so, the lives of the clutches may be prolonged and/or the directional shift may be completed more quickly and/or at higher speeds. It can be difficult, however, for the operator to use the right amount of braking and to properly time engagement/disengagement of the clutches to allow for smooth and efficient shifting without causing undue wear or damage of the drivetrain components.

An exemplary transmission system is disclosed in U.S. Pat. No. 8,880,303 of Ishikawa et al. that issued on Nov. 4, 2014 ("the '303 patent"). The transmission system of the '303 patent includes a vehicle control unit that detects a vehicle travel speed and prevents a shift change in a direction opposite to a vehicle traveling direction, as long as the vehicle travel speed is faster than a first speed. Specifically, when the vehicle control unit detects that a user has selected a shift range in a direction opposite to the vehicle traveling direction, while the vehicle travel speed is faster than the first speed, the vehicle control unit carries out a compulsory deceleration via hydraulic brakes to stop the vehicle instead of permitting the shift change. The shift change is only then permitted after the vehicle is stopped and the engine of the vehicle is in an idle state. Since the vehicle control unit ignores an erroneous shift change in a direction opposite to the vehicle traveling direction during high speed travel, a breakdown of the vehicle is prevented.

Although the shift strategy employed by the vehicle control unit of the '303 patent may have some effect on vehicle component life, the focus of the strategy is accommodating operator error. In particular, the vehicle control unit may do little to improve shift quality during a desired high-speed shift. In addition, the vehicle control unit may not be applicable to situations where the operator has not made an error in requesting a directional shift change.

The disclosed transmission system is directed to overcoming one or more of the problems set forth above and/or other problems of the prior art.

SUMMARY

In one aspect, the present disclosure is directed to a transmission system for use with a machine having an engine and a traction device. The transmission system may include a first clutch configured to transfer power from the engine to the traction device in a first direction, a second clutch configured to transfer power from the engine to the traction device in a second direction opposite the first direction, a brake configured to apply a retarding torque to the traction device, and an interface device configured to generate a first signal indicative of an operator's desire to shift power transfer directions from the engine to the traction device. The transmission system may also include a controller in communication with the first clutch, the second clutch, the brake, and the interface device. The controller may be configured to cause disengagement of the first clutch in response to the first signal, to cause the brake to apply the retarding torque to the traction device, and to determine an amount of the retarding torque being applied by the brake to the traction device. The controller may also be configured to selectively transfer the retarding torque from the brake to the second clutch when a capacity of the second clutch to provide retarding torque is about equal to the amount of the retarding torque being applied by the brake.

In another aspect, the present disclosure is directed to a method of automatically shifting traveling directions of a machine having an engine and a traction device. The method may include transferring power from the engine through a first directional clutch to the traction device in a first direction, and receiving input indicative of an operator's desire to transfer power from the engine to the traction device in a second direction. The method may further include disengaging the first directional clutch in response to the input, and causing a brake to apply a retarding torque to the traction device. The method may further include determining an amount of the retarding torque being applied by the brake to the traction device, and selectively causing a second directional clutch to assume the retarding torque from the brake when a capacity of the second directional clutch to apply retarding torque is about equal to the amount of the retarding torque being applied by the brake.

In another aspect, the present disclosure is directed to a machine. The machine may include an engine, a traction device, and a transmission having a first directional clutch, a second directional clutch, and a plurality of gear ratio clutches. The transmission may be configured to transfer power from the engine to the traction device in first and second directions and throughout a range of speed-to-torque ratios. The machine may also include a brake configured to apply a retarding torque to the traction device, an interface device configured to generate a signal indicative of an operator's desire to shift power transfer directions of the transmission throughout operation of the transmission within the range of speed-to-torque ratios, and a controller in communication with the transmission, the brake, and the interface device. The controller may be configured to cause disengagement of the first directional clutch in response to the signal, and to cause the brake to apply the retarding torque to the traction device. The controller may also be configured to determine an amount of the retarding torque being applied by the brake to the traction device, and to selectively cause the second directional clutch to assume the retarding torque from the brake when a capacity of the second directional clutch to apply retarding torque is about equal to the amount of the retarding torque being applied by the brake.

DETAILED DESCRIPTION

Figure 1:
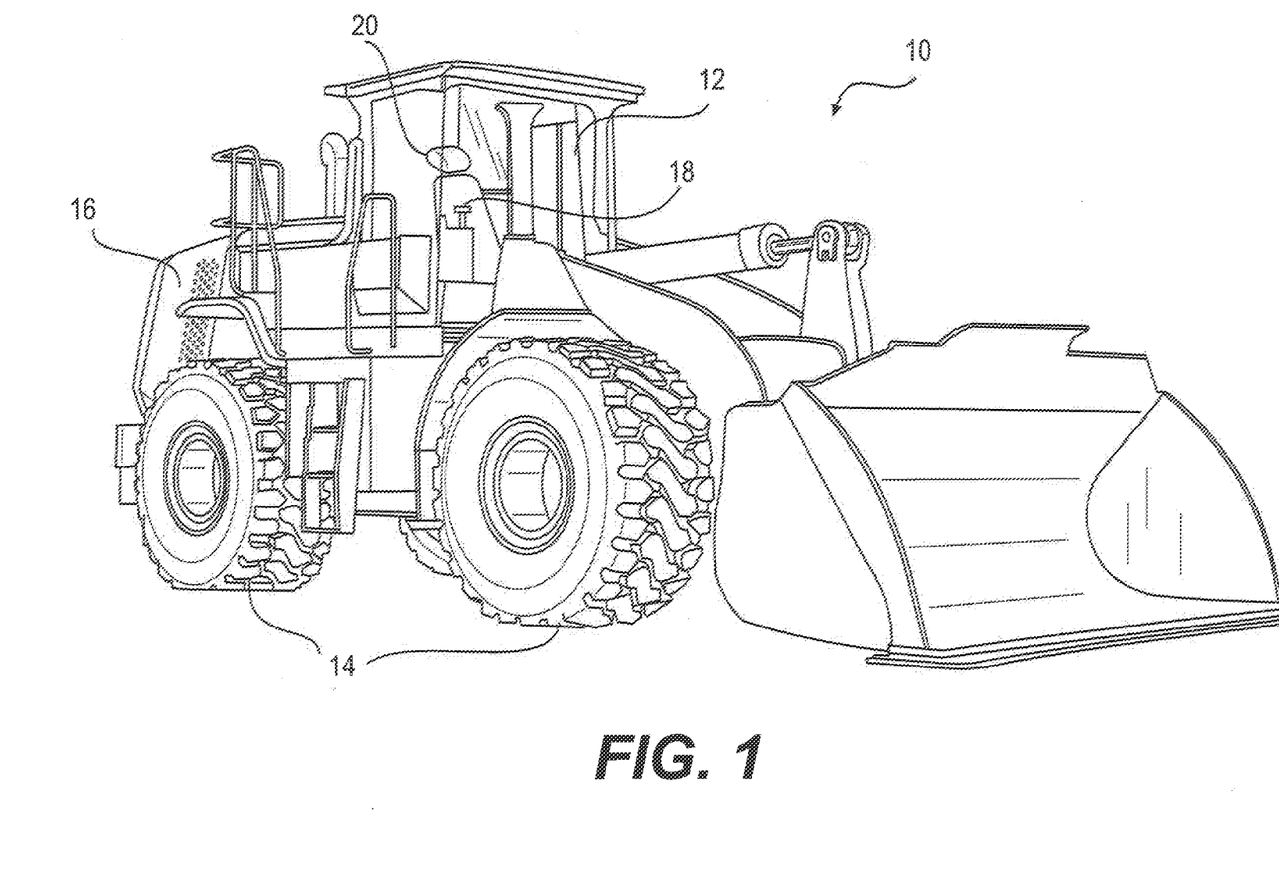
FIG. 1 is an isometric illustration of an exemplary disclosed machine.

FIG. 1 illustrates an exemplary mobile machine 10. In the depicted embodiment, the machine 10 is a wheel loader. It is contemplated, however, that machine 10 may embody another type of mobile machine such as a track-type-tractor, a motor grader, an articulated haul truck, an off-highway mining truck, or another machine known in the art. The machine 10 may include an operator station 12, one or more traction devices 14 that support the operation station 12, and an engine 16 operatively connected to drive the traction devices 14 in response to input received via the operator station 12.

The operator station 12 may include interface devices that receive input from a machine operator indicative of desired machine maneuvering. Specifically, the operator station 12 may include one or more interface devices 18 located proximate a seat 20 for use by a machine operator. The interface devices 18 may initiate movement of machine 10 by producing displacement signals that are indicative of desired machine maneuvering. In one embodiment, the operator interface devices 18 include a shift button. As an operator manipulates the shift button, the machine 10 may be caused to automatically shift travel directions (e.g., from forward to reverse or from reverse to forward). It is contemplated that an operator interface device 18 other than a shift button may additionally or alternatively be provided within the operator station 12 for movement control of machine 10, if desired.

Figure 2:
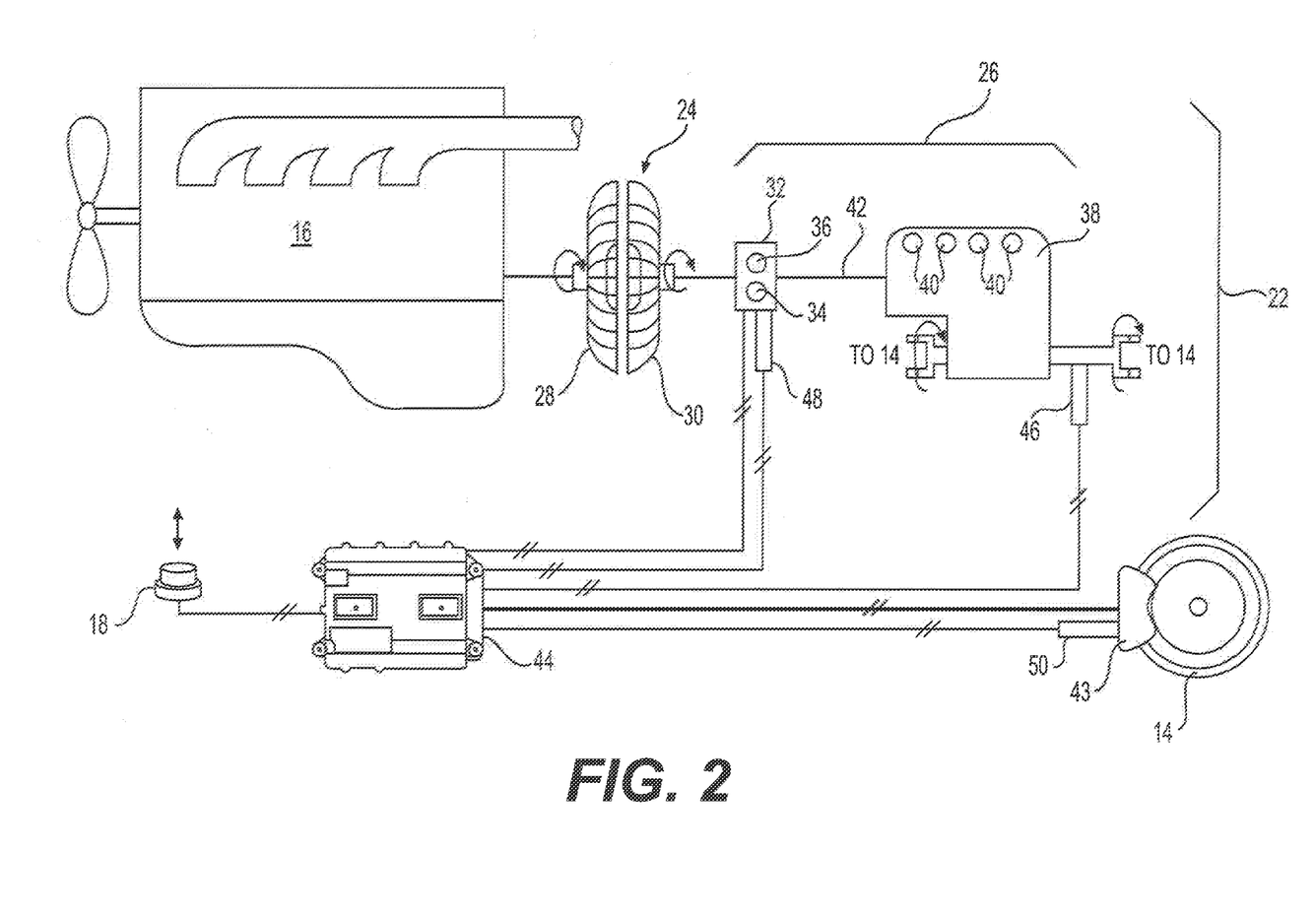
FIG. 2 is an diagrammatic illustration of an exemplary disclosed transmission system that may be used with the machine of FIG. 1.

As shown in FIG. 2, the engine 16 may be operatively connected to the traction devices 14 by way of a transmission system 22. The transmission system 22 may include, among other things, a torque converter 24, and a transmission 26 that is operatively connected to the engine 16 by way of the torque converter 24. The transmission 26 may, in turn, be connected to the traction devices 14 directly or indirectly (e.g., by way of a final drive—not shown), as desired. In the depicted example, the engine 16 is an internal combustion engine (e.g., a diesel, gasoline, or natural gas engine).

The torque converter 24 may be a conventional type of torque converter having an impeller 28 connected to an output of the engine 16, and a turbine 30 connected to an input of transmission 26. In some embodiments, the torque converter 24 may additionally have a lockup clutch (not shown) disposed between the engine output and the transmission input in parallel with the impeller 28 and the turbine 30. In this configuration, as the engine output rotates the impeller 28, a flow of fluid may be generated and passed through the turbine 30, causing the turbine 30 to rotate and drive the transmission input. This fluid connection, while capable of passing power from the engine 16 to the transmission 26, may drive the transmission input to rotate at a different speed and/or with a different torque than what is received from the engine output. This may allow a load of the transmission 26 to be somewhat isolated from the engine 16, such that shock-loading of the engine 16 does not occur. In addition, the fluid coupling facilitated by the torque converter 24 may allow for torque multiplication in some applications. It is contemplated that the torque converter 24 could be omitted, if desired, and the transmission 26 connected directly to the output of the engine 16, if desired.

The transmission 26 may be a step-change transmission having multiple distinct gear ranges in both a forward travel direction and in a reverse travel direction. It should be noted that other types of transmissions (e.g., a hydraulic or hybrid transmission) may be used, if desired. As a step-change transmission, the transmission 26 may include a front box 32 housing a forward travel clutch 34 and a reverse travel clutch 36, and a rear box 38 housing a plurality of the different speed range clutches 40. The clutches 34 and 36 may be selectively engaged to connect a mechanical rotation of the turbine 30 to an input shaft 42 of the rear box 38. When the forward travel clutch 34 is engaged, the traction devices 14 may be caused to rotate in a forward travel direction. When the reverse travel clutch 36 is engaged, the traction devices 14 may be caused to rotate in a reverse travel direction. The speed range clutches 40 may be selectively engaged and disengaged based on any number of factors known in the art to adjust a speed-to-torque ratio of the transmission 26. For example, the speed range clutches 40 may be engaged and disengaged based on a travel direction, based on a travel speed, based on loading, when commanded by an operator, etc. It is contemplated that the clutches 34, 36, and 40 could alternatively be housed within the same box, if desired.

The clutches 34, 36, and 40 may all be hydraulic-type clutches. In particular, the clutches 34, 36, and 40 may each be configured to selectively receive a flow of pressurized fluid that causes engagement of portions of a gear train (not shown) within the transmission 26. Each of the clutches 34, 36, and 40 may include an interior actuating chamber (not shown) that, when filled with pressurized fluid, displaces a piston (not shown) toward one or more input disks (not shown) and one or more output plates (not shown) that are interleafed with the input disks. The combination of input disks and output plates are known as a clutch pack. As the actuating chamber is filled with fluid, the piston "touches up" to the clutch pack to press the input disks against the output plates. This may initiate engagement of the clutch, and power may begin to be transferred between the input disks and the output plates through friction. As the pressure of the fluid inside the actuating chamber increases, a strength of the engagement and the associated power transfer likewise increases. That is, when the pressure of the fluid is low, slippage between the input disks and the output plates may occur and the associated power transfer efficiency loss through the clutch may be absorbed by friction material of the input disks and/or output plates. When the pressure of the fluid is high, the clutch may no longer slip and a majority of the power transferred into the clutch via the input disks may pass back out of the clutch to downstream components via the output plates. The combination of engaged clutches may determine the output rotational direction and the speed-to-torque ratio of the transmission 26.

A timing between clutch engagement/disengagement can affect shift quality. For example, if an engaging one of the clutches 34, 36 is filled with pressurized fluid while the machine 10 is still moving in a first direction, the engaging one of the clutches 34, 36 must first absorb the momentum associated with the machine's movement in the first direction before acceleration of the machine 10 in the second direction can begin. This momentum absorption may occur within the friction material of the clutch pack. And if the engaging one of the clutches 34, 36 fully engages too quickly (i.e., before enough of the momentum is absorbed), the engagement can result in shock-loading that can damage machine components. For this reason, engagement/disengagement of the clutches 34 and 36 may be selectively coordinated with engagement of a brake 43.

In the disclosed embodiment, the brake 43 is a hydraulic wheel brake associated with the traction device 14. That is, the brake 43 may be provided with a pressure that functions to generate friction on material inside the brake used to slow the rotation of the traction device 14. In some instances, the force is the result of a hydraulic pressure being applied to the friction material. In other instances, the force is the result of spring force being applied as hydraulic pressure is reduced. Other configurations may also exist, and the brake 43 may take any form known in the art. For example, the brake 43 may be an external dry brake, an internal wet brake, or another type of brake. For the purposes of this disclosure, the brake 43 may be considered a part of the transmission system 22.

A controller 44 may be in communication with the interface device 18, clutches 34 and 36, and brake 43, and configured to automatically adjust operation of the transmission system 22 during a directional shift of the machine 10. For example, based on an operator's desire to shift travel directions, the controller 44 may selectively cause disengagement of one or clutches 34 and 36, activation of brake 43, and engagement of the other of clutches 34 and 36. This automated control may result in smooth directional changes with little component wear and shock-loading. In addition, the automated control may allow for higher-speed directional changes.

The controller 44 may include a memory, a secondary storage device, a clock, and one or more processors that cooperate to accomplish a task consistent with the present disclosure. Numerous commercially available microprocessors can be configured to perform the functions of the controller 44. It should be appreciated that the controller 44 could readily embody a general transmission or machine controller capable of controlling numerous other functions of the machine 10. Various known circuits may be associated with the controller 44 including signal-conditioning circuitry, communication circuitry, and other appropriate circuitry. It should also be appreciated that the controller 44 may include one or more of an application-specific integrated circuit (ASIC), a field-programmable gate array (FPGA), a computer system, and a logic circuit configured to allow the controller 44 to function in accordance with the present disclosure.

In some embodiments, the controller 44 may rely on sensory information when regulating the operations of the transmission system 22. For example, in addition to receiving the signals generated by interface device 18 requesting the automated directional shift change, the controller 44 may also communicate with one or more sensors to detect actual pressures inside the transmission system 22 that are indicative of a shift status. These sensors could include, for example, a transmission output speed sensor 46, one or more clutch pressure sensors 48, and a brake sensor 50. The controller 44 may implement the automatic adjustments of the transmission system 22 described above based on the signals generated by these sensors.

Figure 3:
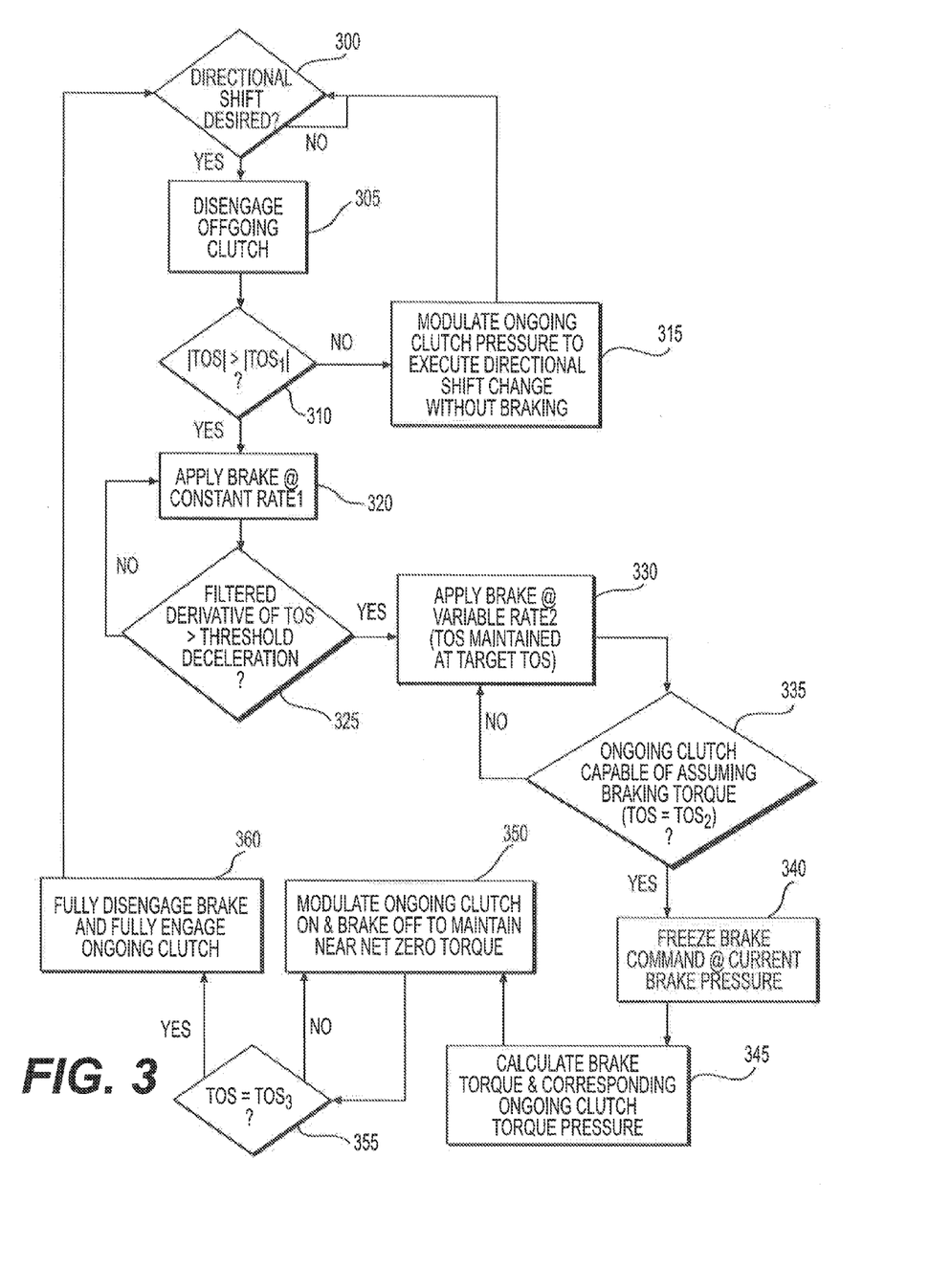
FIG. 3 is a flowchart depicting an exemplary disclosed control algorithm associated with operation of the transmission system of FIG. 2.
Figure 4:
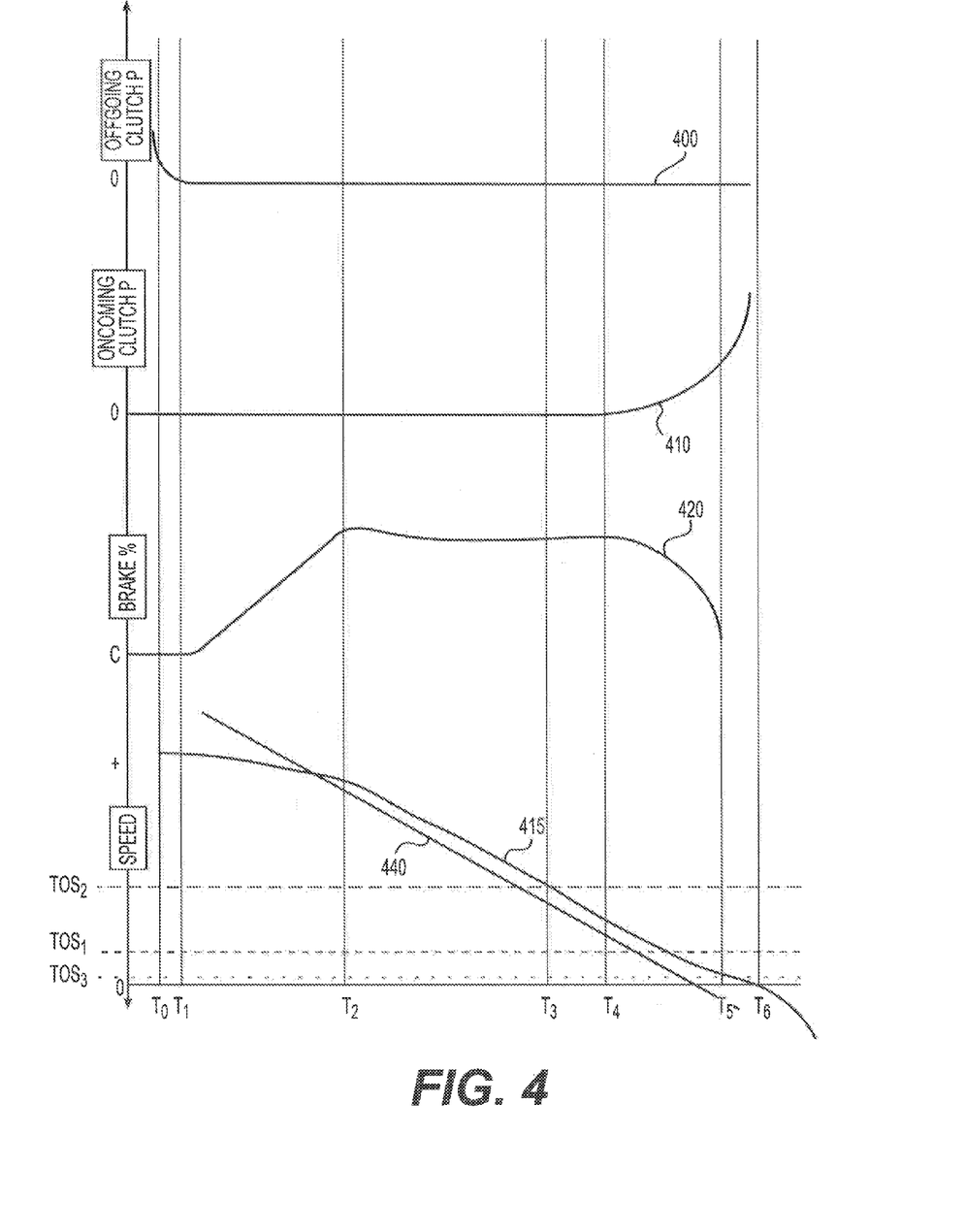
FIG. 4 includes graphs illustrating performance parameters of the transmission system of FIG. 2 during implementation of the control algorithm of FIG. 3.

FIG. 3 is a flowchart depicting an exemplary method of transmission control that may be implemented by the controller 44, while FIG. 4 includes a compilation of graphs illustrating performance parameters of the transmission system 22 during an exemplary automated control event (i.e., during an automated directional shift). These figures will be discussed in the following section to further illustrate the disclosed concepts.

INDUSTRIAL APPLICABILITY

While the transmission system of the present disclosure has potential application in any machine requiring multiple speed and torque transmission levels in two directions, the disclosed transmission system may be particularly applicable to wheel loaders, motor graders, track-type-tractors, articulated haul trucks, off-highway mining trucks, and other heavy construction machines. Such machines have specific gearing and cycle time requirements that the disclosed transmission system may be especially capable of meeting. The disclosed transmission system may improve the shift quality of any machine by selectively and automatically affecting transmission characteristics such as clutch pressures, clutch engagement timings, and brake pressures. Operation of the transmission system 22 will now be described in detail.

The shifting of transmission 26 may be done at any time that the machine 10 is operational. Shifting may be initiated manually or automatically, and may include directional shift changes and/or gear ratio shift changes. To initiate an automated directional shift change, the operator of the machine 10 may depress or otherwise manipulate the interface device 18 (e.g., the shift button—referring to FIG. 2). The operator may depress interface device 18 when moving in any direction, in any gear, and at any speed. The controller 44 may continuously monitor the use of the interface device 18 to determine if an automated shift in travel direction is desired (Block 300). The controller 44 may consider the automated directional shift to be desired by the operator when the interface device 18 has been depressed and generates a corresponding signal. Control may loop through block 300 until the signal is generated. In the example depicted in FIG. 4, receipt of the shift button signal may correspond with a time $T_0$.

At some point after receiving the signal from the interface device 18, the controller 44 may cause the appropriate one of the clutches 34 and 36 to disengage (Block 305). For example, when machine 10 is traveling in the forward direction and the operator depresses the interface device 18, the controller 44 may disengage forward the clutch 34 such that engine 16 is no longer actively driving the traction devices 14 in a forward direction. And when machine 10 is traveling in the reverse direction and the operator depresses interface device 18, the controller 44 may disengage reverse the clutch 36 such that the engine 16 is no longer actively driving the traction devices 14 in a reverse direction. In the flowchart of FIG. 3 and in the example of FIG. 4, the one of the clutches 34 and 36 being disengaged during a directional shift may be considered the "offgoing clutch", whose operation is represented by a pressure curve 400 in FIG. 4. And the other of the clutches 34 and 36 may be considered the "oncoming clutch", whose operation is represented by a pressure curve 410. As can be seen in FIG. 4, the disengagement of the offgoing clutch may not be instantaneous. That is, the controller 44 may initiate clutch disengagement by causing a pressure reduction in the clutch pack of the offgoing clutch, which may take place over a period of time related to a specific configuration of the offgoing clutch. During this disengagement, the amount of power being transmitted through the offgoing clutch may reduce gradually in a linear or non-linear manner. As can be seen in the curve 410, pressurization of the oncoming clutch may not begin during disengagement of the offgoing clutch. In fact, a significant time lag may even exist between disengagement of the offgoing clutch and engagement of the ongoing clutch, in some instances. It may even be possible, in some situations, for the ongoing clutch to begin pressurizing before the offgoing clutch is commanded to reduce its pressure.

Throughout the process of automated directional shifting, the controller 44 may continuously monitor the output speed of the transmission 26 (i.e., the TOS) and, after disengagement of the offgoing clutch, the controller 44 may compare the TOS to a threshold speed value $TOS_1$ (Block 310). The TOS may be monitored by way of speed sensor 46 and may be represented in the example of FIG. 4 by a speed curve 415. The threshold value $TOS_1$ may be a value above which directional shifting without braking may be problematic. For example, when the TOS is greater than the threshold speed $TOS_1$, shifting directions without braking could be damaging to components of the machine 10, could reduce a life of the components, and/or could result in unstable (e.g., jerky or uncomfortable) machine operation. The threshold speed $TOS_1$ may be different for each machine 10, each transmission 26, and/or each clutch configuration. The threshold speed $TOS_1$ may also be configurable by the operator of (or another entity associated with) machine 10. In the example of FIG. 4, the TOS at time $T_0$ is shown as being greater than the threshold speed $TOS_1$.

When the controller 44 determines at block 310 that the TOS is not greater than the threshold speed $TOS_1$ (i.e., when the TOS is equal to or less than the threshold speed $TOS_1$), the controller 44 may modulate the pressure in the oncoming clutch to complete the directional shift without activating the brake 43 (Block 315). That is, the controller 44 may cause the pressure inside of the clutch pack of the oncoming clutch to increase until full engagement is achieved. The pressure may be monitored via the clutch pressure sensor 48, and the increase in pressure may take place over a period of time related to the configuration of the oncoming clutch. The increase may be linear or non-linear, as desired. Control may return from block 315 to block 300.

When the controller 44 determines at block 310 that the TOS is greater than the threshold speed $TOS_1$, the controller 44 may initiate application of brake 43 at a substantially constant rate of increase (Block 320). For example, the controller 44 may generate a command that causes the pressure on the friction material of brake 43 to increase at a substantially constant rate. For the purposes of this disclosure, the term "substantially constant" may be defined as "constant within engineering tolerances." In the example of FIG. 4, operation of brake 43 at any given point in time may be represented by a command the curve 420 as a percent of a maximum brake command, with the application of brake 43 initiating after a time $T_1$. It should be noted that, although the application of brake 43 is shown as initiating after the offgoing clutch pressure has reduced to about zero, it is contemplated that brake 43 could be applied at some point during the depressurization of the offgoing clutch (i.e., before the pressure has reached zero), if desired. For the purposes of this disclosure, the term "about" may be defined as "within engineering tolerances." The constant rate of braking increase may be represented by the slope of curve 420 after time $T_1$, and may be set at any desired rate. In the disclosed example, the constant rate of braking increase may correspond with a maximum braking that is acceptable in terms of operator feel. For example, the constant rate of braking increase may be about the same as a recent maximum braking rate that was manually implemented by the operator. This increase in the braking rate may function to rapidly pre-calibrate the controller 44 for subsequent braking changes. The pressure on the friction material of the brake 43, and therefore the actual braking of the machine 10, may be monitored via the sensor 50.

It is contemplated that the constant increase in the command of brake 43 during completion of block 320 may not necessarily start at a point of zero braking, as shown in FIG. 4. In particular, it may be possible for the command of the brake 43 to first step from zero to a minimum level before the command is caused to increase at the constant rate, if desired. The step increase may be associated only with the filling of chambers/pistons/passages within brake 43 (i.e., associated only with the preparation of brake 43 to begin retarding machine motion), without significant retarding actually being realized. It is also contemplated, however, that the command of brake 43 implemented during completion of block 320 could alternatively step from zero to a level above the minimum level required for mere brake preparation, in some situations. For example, the command could step from zero to a preliminary level of braking that actually retards machine 10 somewhat, but that is also known to be less than required to achieve the target deceleration rate. Both of these optional steps may help reduce a time required for directional shifting. One or both of these steps may be selectively implemented based on any number of different condition, for example based on a starting gear when directional shifting is required, a pitch of the machine 10, TOS at a time of shift request, estimated machine weight, etc.

At some point during the application of brake 43, the machine 10 will begin to decelerate, and the deceleration may be detectable via the peed sensor 46. Accordingly, the controller 44 may take a time-based derivative of the signal from the speed sensor 46, filter the derivative to remove noise from the signal, and compare the filtered derivative to a threshold deceleration (Block 325). The primary purpose of block 325 may be to determine at what brake command a noticeable deceleration of machine 10 occurs. Noticeable deceleration may be considered to have occurred only when the filtered derivative of the TOS is greater than the threshold deceleration, and the threshold deceleration may be different for each machine. Control may cycle from block 325 through block 320 until the filtered derivative of TOS becomes greater than the threshold deceleration. That is, the controller 44 may continue to increase the braking command of brake 43 at the constant rate until the machine 10 starts to decelerate noticeably. In the example of FIG. 4, the machine 10 starts to decelerate noticeably at a time $T_2$.

Once the machine 10 starts to noticeably decelerate (i.e., once the filtered derivative of the TOS becomes greater than the threshold deceleration), the controller 44 may begin to apply brake 43 at a variable rate such that the deceleration rate of TOS is maintained about the same as a target deceleration rate (Block 330), which is represented in FIG. 4 as a line 440. In particular, the controller 44 may continuously determine a slope of the curve 415, and selectively adjust the rate of brake application (i.e., the brake command and rate of change of the brake 43) such that the slope of curve 415 after time $T_2$ remains about the same as the slope of line 440. By comparing only the slope of curve 415 to the slope of line 440 (rather than continuously comparing a filtered time-based derivative to a desired deceleration rate), the amount of calculations being performed by the controller 44 may be lower. This calculation reduction may result in a more responsive system and/or require less computing power. The target deceleration rate used in block 330 may be greater than the threshold deceleration used in block 325. In one embodiment, the threshold deceleration is some percent of the target deceleration that allows the actual deceleration of machine 10 to approach the target deceleration at time $T_2$, without overshooting the target deceleration.

When controlling braking of machine 10 at the variable rate (i.e., when implementing block 330), the controller 44 may utilize a proportional-integral (PI) algorithm. The PI algorithm utilized by the controller 44 may be a control-loop algorithm that calculates an error value as a difference between the slope of curve 415 and the slope of curve 440 (regardless of offset), and generates a braking command change that attempts to reduce the error. It should be noted that, during the variable rate control portion of the automated shift, a maximum limit on braking increase may still be imposed. In the disclosed embodiment, this limit may be the same rate of braking increase used between times $T_1$-$T_2$, and corresponds with a maximum amount of braking normally acceptable to the operator (i.e., a comfortable braking rate).

The controller 44 may determine the braking command at block 330 in a unique way. Specifically, since the goal of the controller 44 is not to force the TOS to match a specific target TOS value, but instead to bend the TOS parallel to the TOS target line, the integral error may only accrue when the TOS diverges from the target TOS line. That is, the TOS may be offset from the target TOS line without incrementing the integral error, as long as the TOS is not diverging from the target TOS line.

During application of brake 43 at the variable rate, the controller 44 may continuously check to see if the oncoming clutch is capable of assuming the braking torque currently being carried by brake 43 (Block 335). That is, at time $T_2$, the torque being applied by brake 43 to decelerate machine 10 may be too large for proper dissipation by the friction material of the oncoming clutch. In other words, if brake 43 were to stop retarding the motion of machine 10 and the momentum of machine 10 instead began passing through the friction material of the oncoming clutch, the oncoming clutch could wear prematurely or even fail. At some point after time $T_2$, however, the momentum of the machine 10 will have reduced to a level that can be properly dissipated by the friction material of the oncoming clutch. This level is represented by a transmission output speed $TOS_2$ in the example of FIG. 4. Thus, at block 335, the controller 44 may compare the current TOS to $TOS_2$ to determine if the oncoming clutch is capable of assuming the retarding torque from brake 43. As long as the current TOS is greater than $TOS_2$, control may cycle from block 335 back to block 330.

When the comparison of block 335 indicates that the current TOS is equal to $TOS_2$, the controller 44 may freeze the current braking command (Block 340). That is, the controller 44 may cause the current command of brake 43 to be maintained, for example by way of feedback from the sensor 50. This may correspond with time $T_3$ in the example of FIG. 4. Thereafter, the controller 44 may calculate an amount of braking torque currently being applied by brake 43 to machine 10, and a corresponding pressure inside of the oncoming clutch that would be required to generate an equivalent amount of torque (Block 345). The braking torque may be calculated in any manner known in the art. In the disclosed example, the braking torque is calculated based on the braking command (e.g., the frozen pressure) and known geometry of brake 43. Similarly, the corresponding pressure inside the oncoming clutch may be calculated in any manner known in the art. In the disclosed example, the corresponding clutch pressure is calculated by multiplying the braking torque by a coefficient that is specific to known geometry of the oncoming clutch.

After completion of block 345, the controller 44 may then begin modulating the pressures of the oncoming clutch and the force on the friction material of brake 43 such that a near net zero torque handoff is achieved (Block 350). In other words, the controller 44 may begin reducing the command of the brake 43 at about the same time as increasing the pressure of the oncoming clutch and by about the same amounts, such that the torque reduction of brake 43 is about the same as the torque increase of the oncoming clutch. In this way, the torque hand off may not be discernible to the operator.

In the disclosed example, the torque handoff between brake 43 and the oncoming clutch may be a linear handoff determined as a function of transmission output speed. In particular, at $TOS_2$, the brake 43 may be applying 100% of the retarding torque to machine 10, while at a slower speed $TOS_3$, the oncoming clutch should be applying 100% of the retarding torque. And as the TOS slows from $TOS_2$ to $TOS_3$, the brake 43 may transfer the load of retarding torque to the oncoming clutch in an amount proportional to the TOS progress from $TOS_2$ to $TOS_3$. For example, during a handoff beginning at 1500 rpm and ending at 300 rpm, when the current TOS is 600 rpm (or about 75% of the way between 1500 rpm and 300 rpm), the brake 43 will be carrying about 25% of the retarding torque of machine 10 and the oncoming clutch will be carrying about 75% of the retarding torque. In one embodiment, the controller 44 may first cause the oncoming clutch to pick up its share of the retarding torque before causing brake 43 to shed its corresponding share. It is contemplated that the torque handoff between brake 43 and the oncoming clutch could be non-linear, if desired.

During the torque handoff between brake 43 and the oncoming clutch, the controller 44 may continuously compare the current TOS to $TOS_3$ to determine when the handoff can be completed (Block 355). Until TOS is about equal to $TOS_3$, control may loop through blocks 350 and 355. Thereafter, the controller 44 may fully disengage brake 43 and fully engage the oncoming clutch (Block 360). That is, the controller 44 may fully release brake 43 and increase the pressure inside the clutch pack of the oncoming clutch to a maximum pressure. Control may pass from block 360 to block 300.

The disclosed transmission system may improve shift quality during a desired high-speed directional shift. In particular, because the disclosed transmission system may utilize braking during directional shifting, the system may not be speed-limited by an amount of friction material in the directional clutches. This may allow for shifting at any speed, which may improve productivity and profitability in some applications. In addition, because the shifting may be automatically implemented, the torque handoff between braking and clutching may be smooth and rate-controlled for efficient and quick directional changes.

It will be apparent to those skilled in the art that various modifications and variations can be made to the transmission system of the present disclosure without departing from the scope of the disclosure. Other embodiments will be apparent to those skilled in the art from consideration of the specification and practice of the control system disclosed herein. For example, although the clutches 34 and 36 and the brake 43 have been described as being pressurized to increase an amount of torque passing therethrough, it is contemplated that depressurizing these devices could alternatively result in the torque increase. It is also contemplated that the blocks of FIG. 3 could be rearranged into a different order, if desired. For example, block 305 may be completed at about the same time as or at some point after blocks 310 and 315, if desired. It is intended that the specification and examples be considered as exemplary only, with a true scope of the disclosure being indicated by the following claims and their equivalents.

What is claimed is:

1. A transmission system for a machine having an engine and a traction device, the transmission system comprising:
    a first clutch configured to transfer power from the engine to the traction device in a first direction;
    a second clutch configured to transfer power from the engine to the traction device in a second direction opposite the first direction;
    a brake configured to apply a retarding torque to the traction device;
    an interface device configured to generate a first signal indicative of an operator's desire to shift power transfer directions from the engine to the traction device; and
    a controller in communication with the first clutch, the second clutch, the brake, and the interface device, the controller being configured to:
        cause disengagement of the first clutch in response to the first signal;
        cause the brake to apply the retarding torque to the traction device;
        determine an amount of the retarding torque being applied by the brake to the traction device; and
        selectively transfer the retarding torque from the brake to the second clutch when a capacity of the second clutch to provide retarding torque is about equal to the amount of the retarding torque being applied by the brake.

2. The transmission system of claim 1, further including a sensor configured to generate a second signal indicative of a pressure on friction material of the brake, wherein the controller is configured to determine the amount of the retarding torque being applied by the brake based on the second signal.

3. The transmission system of claim 1, wherein the controller is configured to determine the capacity of the second clutch to provide retarding torque based on a configuration of friction material inside the second clutch.

4. The transmission system of claim 3, further including a sensor configured to generate a second signal indicative of at least one of a speed and a rotational direction of the transmission system, wherein the controller is configured to cause the brake to apply the retarding torque only during directional shifting when the second signal indicates the speed is outside a range of speeds associated with the capacity of the second clutch.

5. The transmission system of claim 1, further including a sensor configured to generate a second signal indicative of a speed of the transmission system, wherein the controller is configured to cause the brake to apply torque at a constant rate of increase until the second signal indicates the speed of the transmission system has started to decelerate at a threshold rate.

6. The transmission system of claim 5, wherein the constant rate of increase is based on a recent manual braking rate.

7. The transmission system of claim 5, wherein the controller is configured to cause the brake to apply the retarding torque at a variable rate after the second signal indicates the speed of the transmission system has started to decelerate at the threshold rate.

8. The transmission system of claim 7, wherein the controller is configured to adjust the variable rate to maintain deceleration of the transmission system about equal to a target deceleration rate.

9. The transmission system of claim 5, wherein the controller is configured to determine that the speed of the transmission system has started to decelerate at the threshold rate when a filtered derivative of the second signal has a value greater than the threshold rate.

10. The transmission system of claim 5, wherein the controller is configured to selectively transfer the retarding torque from the brake to the second clutch in a manner that produces a net zero torque handoff.

11. The transmission system of claim 10, wherein the controller is configured to load the second clutch with an amount of torque before causing the brake to release the amount of torque.

12. The transmission system of claim 5, wherein the controller is configured to cause the brake to maintain a constant friction material pressure after the controller determines that the capacity of the second clutch to provide retarding torque is about equal to the amount of the retarding torque being applied by the brake.

13. The transmission system of claim 12, wherein the controller is configured to determine the amount of the retarding torque being applied by the brake to the traction device while the brake is maintaining the constant friction material pressure.

14. A method of automatically shifting traveling directions of a machine having an engine and a traction device, the method comprising:
    transferring power from the engine through a first directional clutch to the traction device in a first direction;
    receiving input indicative of an operator's desire to transfer power from the engine to the traction device in a second direction;
    disengaging the first directional clutch in response to the input;
    causing a brake to apply a retarding torque to the traction device;
    determining an amount of the retarding torque being applied by the brake to the traction device; and
    selectively causing a second directional clutch to assume the retarding torque from the brake when a capacity of the second directional clutch to apply retarding torque is about equal to the amount of the retarding torque being applied by the brake.

15. The method of claim 14, further including:
    sensing a friction material pressure of the brake; and determining the amount of the retarding torque being applied by the brake based on the friction material pressure of the brake.

16. The method of claim 14, further including:
sensing a speed of power transfer in the first direction; and
determining the capacity of the second directional clutch to provide retarding torque based on a configuration of friction material inside the second directional clutch and the speed of power transfer in the first direction.

17. The method of claim 16, wherein causing the brake to apply the retarding torque includes causing the brake to apply the retarding torque only during directional shifting when the speed of power transfer in the first direction is above a threshold speed associated with the capacity of the second directional clutch.

18. The method of claim 14, further including sensing a speed of power transfer in the first direction, wherein causing the brake to apply the retarding torque includes causing the brake to apply the retarding torque at a constant rate of increase until the speed of power transfer in the first direction has started to decelerate at a threshold rate.

19. The method of claim 18, wherein:
causing the brake to apply the retarding torque includes causing the brake to apply the retarding torque at a variable rate after the speed of power transfer in the first direction has started to decelerate at the threshold rate; and
the method further includes:
adjusting the variable rate to maintain deceleration of the speed of power transfer in the first direction about equal to a target deceleration rate; and
causing the brake to maintain a constant friction material pressure after the capacity of the second directional clutch to provide retarding torque is determined to be about equal to the amount of the retarding torque being applied by the brake.

20. A machine, comprising:
an engine;
a traction device;
a transmission having a first directional clutch, a second directional clutch, and a plurality of gear ratio clutches, the transmission being configured to transfer power from the engine to the traction device in first and second directions and throughout a range of speed-to-torque ratios;
a brake configured to apply a retarding torque to the traction device;
an interface device configured to generate a signal indicative of an operator's desire to shift power transfer directions of the transmission throughout operation of the transmission within the range of speed-to-torque ratios; and
a controller in communication with the transmission, the brake, and the interface device, the controller being configured to:
cause disengagement of the first directional clutch in response to the signal;
cause the brake to apply the retarding torque to the traction device;
determine an amount of the retarding torque being applied by the brake to the traction device; and
selectively cause the second directional clutch to assume the retarding torque from the brake when a capacity of the second directional clutch to apply retarding torque is about equal to the amount of the retarding torque being applied by the brake.

* * * * *